United States Patent Office 3,438,503
Patented Apr. 15, 1969

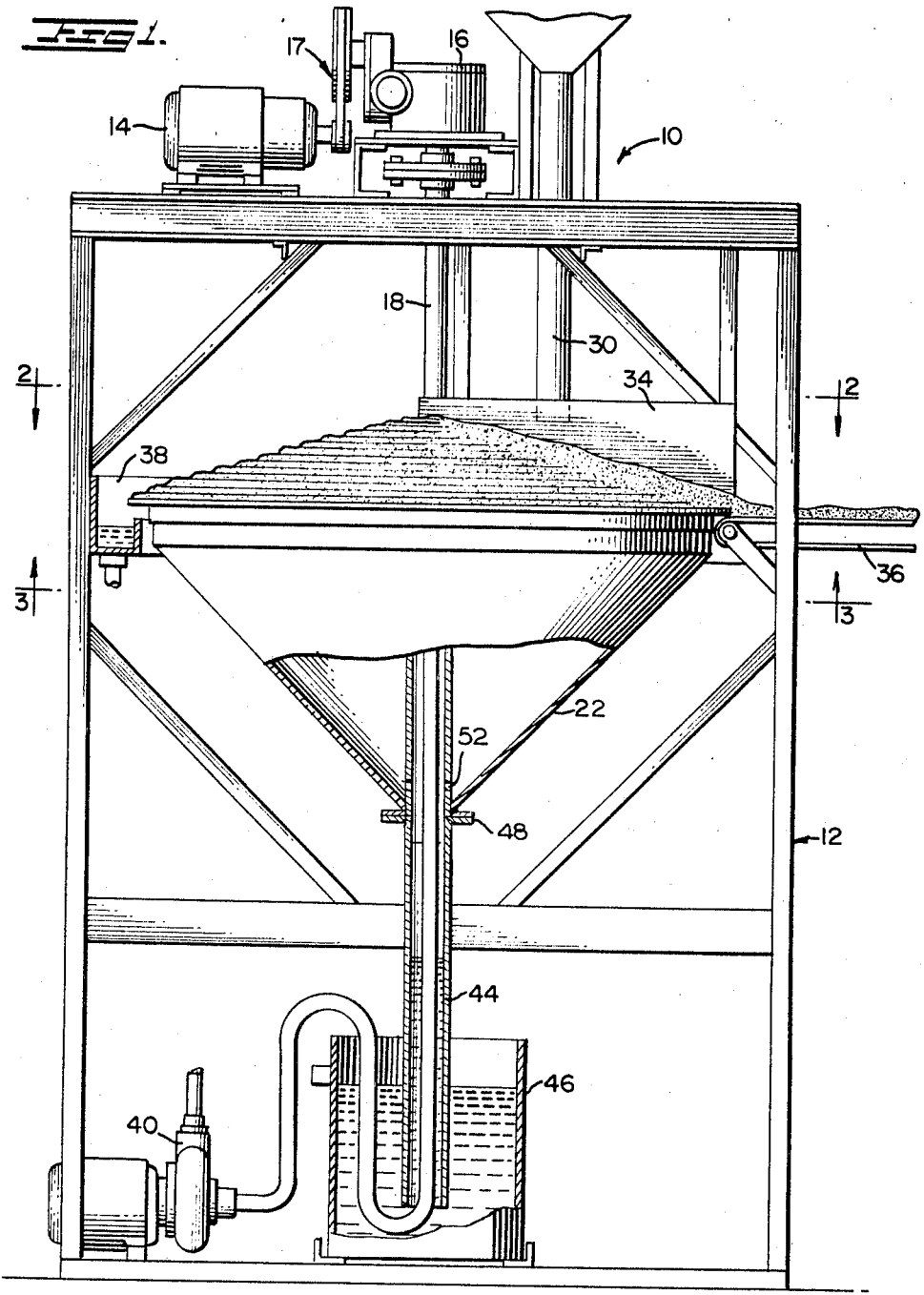

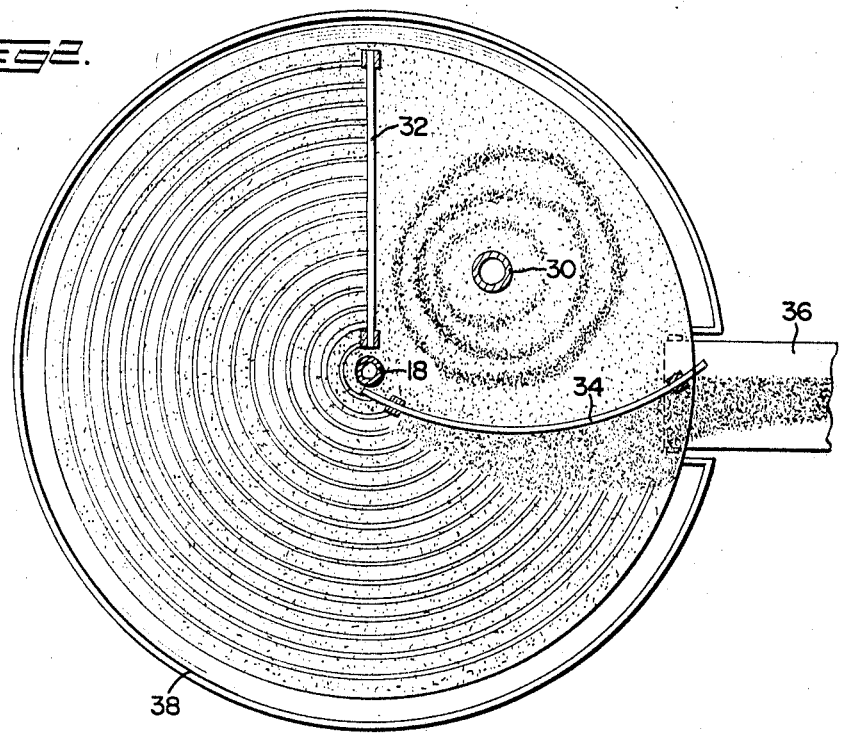
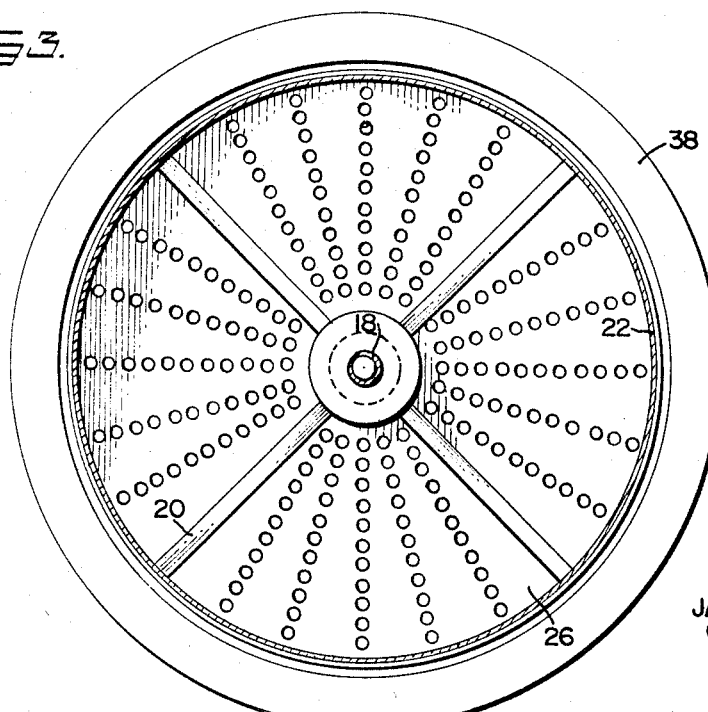
INVENTOR
JAMES HALL
CARPENTER
ATTORNEYS

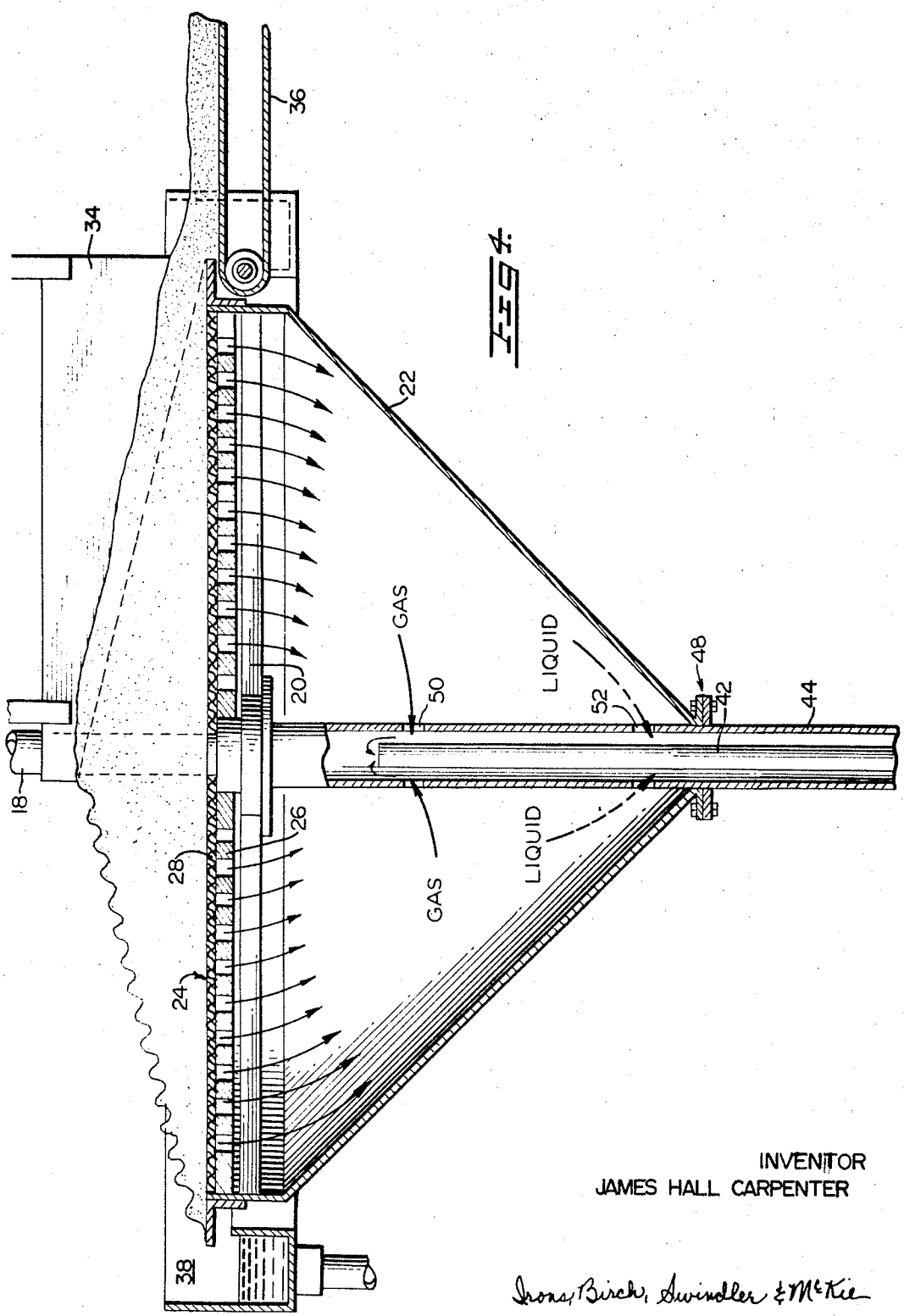

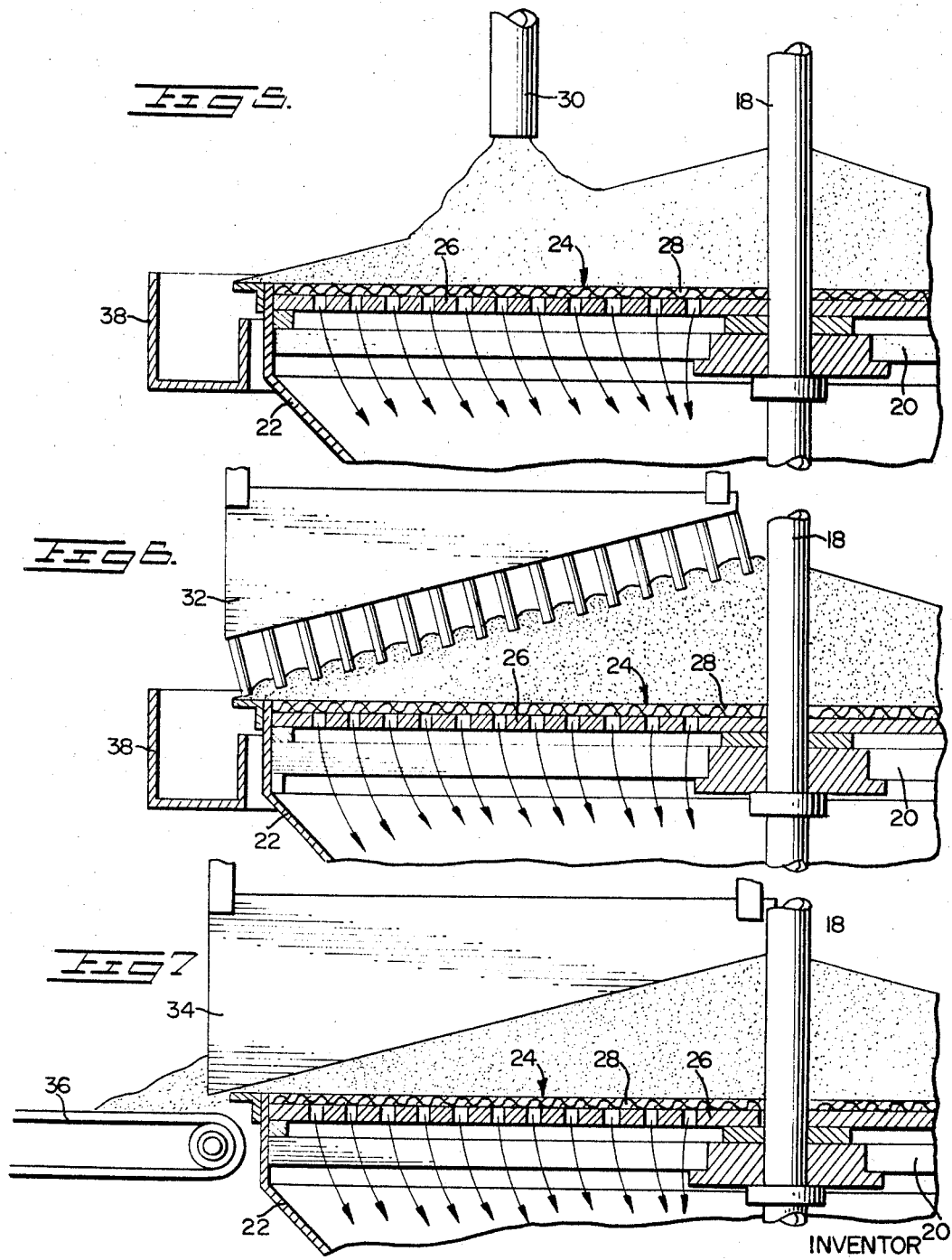

3,438,503
ROTARY VACUUM FILTER
James Hall Carpenter, Jacksonville, Fla., assignor to Carpco Research & Engineering Inc., Jacksonville, Fla., a corporation of Florida
Filed July 22, 1968, Ser. No. 746,534
Int. Cl. B01d 33/00
U.S. Cl. 210—396                9 Claims

ABSTRACT OF THE DISCLOSURE

A rotary vacuum filter for dewatering particulate material having means for removing the particulate material from a rotatable filter medium, wherein the removing means shapes the material into a substantially conical configuration so that water will flow from the upper surface of the material and pass downwardly over the periphery of the filter medium to thereby reduce the amount of water required to be withdrawn from the material through the medium.

BACKGROUND OF THE INVENTION

Field of the invention

This invention relates to rotary vacuum filters, and specifically to an improved means for removing particulate material from the filter medium of such a filter.

Description of the prior art

Rotary vacuum filters have long been used for dewatering particulate materials, such as crushed ore constituents, which are entrained in a slurry. Such devices generally include a rotatably mounted filter medium on which a slurry of the material to be dewatered is fed, and through which water is drawn from the material by a vacuum-applying means. Conventionally, the dewatered material is removed from the medium by a stationary plow or rotary auger.

Exemplary of such filters are the devices shown in Cording et al. Patent 2,636,612 and Hursh Patent 2,716,494, which disclose both a rotary auger and stationary plow for removing dewatered particulate material from a rotatable filter medium. As taught by these two patents, the plow or auger of the prior art filters generally is positioned above the filter medium in such a manner as to sweep the dewatered material either slightly upwardly or substantially horizontally over the periphery of the medium. This sweeping action shapes the upper surface of the material remaining on the medium into either a shallow inverted cone or a substantially horizontal plane onto which the slurry of material to be dewatered is fed continuously. Due to the inverted conical or planar shape of the upper surface of the material, all of the liquid that is drawn from the material must pass downwardly through the medium. Thus, the degree of dewatering achieved by the filter is principally dependent upon the strength of the vacuum applied through the medium.

As will be apparent, the higher the strength of the vacuum required for achieving a particular degree of dewatering, the greater will be the power required for operating the vacuum pump of the vacuum-applying means. Moreover, due to practical limitations on the size of suitable vacuum pumps and the power available for operating such pumps, the rate at which material is processed by the filter may be severely limited if a high degree of dewatering is to be maintained.

For some particulate material treatment processes, such as mineral ore beneficiation processes, in which a high rate of material flow is required if the process is to be economically feasible, the capacity of the rotary vacuum filter used in such process may well limit the flow rate of material through all of the other steps of the process to a rate which renders the process uneconomical. Desirably, therefore, a rotary vacuum filter is needed which is able to dewater large quantities of particulate material on a continuous basis and which utilizes a conventional sized vacuum pump and a reasonable amount of power.

SUMMARY OF THE INVENTION

The rotary vacuum filter of the present invention offers an optimum solution to the problems posed by the limitations of the prior art filters as discussed above.

Basically, the rotary vacuum filter of the invention comprises: a rotatably mounted substantially horizontally disposed filter medium; means for rotating said medium about a substantially vertical axis; means for feeding a slurry of particulate material onto the upper surface of said medium; a vacuum-applying means communicating with the lower surface of said medium for drawing liquid in the slurry downwardly through said medium; and means for removing particulate material from the upper surface of said medium; wherein said particulate material removing means comprises a plow positioned above said medium, said plow having a lower edge extending outwardly and downwardly from said vertical axis to the periphery of said medium so that as the medium rotates under said lower edge, the upper surface of the particulate material on the medium will be shaped into a substantially conical configuration, whereby a portion of the liquid in the slurry will flow from the upper surface of the particulate material and pass downwardly over the periphery of the medium under the influence of gravity, thereby reducing the amount of liquid required to be drawn through the medium by said vacuum-applying means.

As the slurry of material to be dewatered is fed onto the upper surface of the bed of material on the filter medium, virtually all of the material in the slurry is deposited onto and adheres to the bed and thus is not washed over the periphery of the medium with the liquid. Preferably, means are provided about the periphery of the medium for collecting the liquid as it flows thereover. If desired the liquid so collected may be injected into the feed slurry so that any small amount of material which is washed over the periphery of the medium will be reclaimed.

With the foregoing in mind, it is an object of the present invention to provide a rotary vacuum filter which is able to dewater large quantities of particulate material on a continuous basis and which is economical to operate.

It is also an object of the invention to provide a rotary vacuum filter having means for removing particulate material from a rotatable filter medium which means shapes the material on the medium into a substantially conical configuration.

It is a further object of the invention to provide a rotary vacuum filter for dewatering particulate material wherein a substantial quantity of liquid flows over the periphery of the filter medium of such filter to thereby reduce the amount of liquid which must be drawn through the medium by a vacuum-applying means.

These and other objects of the invention will become apparent upon a consideration of the detailed description of a preferred embodiment thereof given in connection with the following drawings.

BRIEF DESCRIPTION OF THE DRAWINGS

FIG. 1 is an elevational view, partially in section, of the rotary vacuum filter of the invention;

FIG. 2 is a sectional view taken on line 2—2 of FIG. 1;

FIG. 3 is a sectional view taken on line 3—3 of FIG. 1;

FIG. 4 is an enlarged vertical sectional view showing the filter medium and associated elements of the rotary vacuum filter of the invention; and FIGS. 5–7 are vertical sectional views showing the relationship of the material feeding means, rake, and plow, respectively, of the rotary vacuum filter of the invention to the filter medium thereof.

DESCRIPTION OF THE PREFERRED EMBODIMENT

A preferred embodiment of the rotary vacuum filter of the invention is shown in FIG. 1, as designated by reference numeral 10. Filter 10 includes a framework 12 for supporting the various operating elements thereof. Attached to the top of framework 12 is an electric motor 14 which is drivingly connected to a speed reducer 16 by a belt and pulley drive 17. The output of speed reducer 16 is drivingly connected to a vertically disposed shaft 18 which extends downwardly through the center of framework 12.

As best shown in FIGS. 3 and 4, a structural spider 20 is affixed to the lower end of shaft 18 for rotation therewith. Spider 20 is connected to and supports a conically shaped conduit member 22. Affixed to the top of member 22 is a substantially horizontally disposed filter medium 24, comprising a perforated plate 26 and a water pervious filter cloth or screen 28. Filter medium 24 rotates with spider 20 and conduit member 22 about the substantially vertical axis defined by shaft 18.

Means are provided for continuously feeding a slurry of particulate material to be dewatered onto the upper surface of medium 24, such as a vertically disposed conduit 30 having an outlet positioned above the medium. As the slurry is fed onto the medium, the medium is rotated in a counterclockwise direction as seen in FIG. 2, carrying the particulate material deposited thereon into engagement with a stationary rake 32 positioned above the medium. The function of rake 32 is to distribute the material across the upper surface of the medium. The ends of the tines of the rake are disposed along a line which extends outwardly and downwardly from the rotational axis of medium 24 to the periphery thereof so that the rake forms a substantially conically shaped bed of material on the medium.

From rake 32, the particulate material is carried by medium 24 into engagement with a stationary plow 34, also positioned above the medium. The function of plow 34 is to sweep dewatered particulate material over the periphery of the filter medium. As best seen in FIG. 7, the lower edge of plow 34 is inclined outwardly and downwardly from the rotational axis of the medium to the periphery thereof so that as the medium rotates under the plow the material not swept therefrom is shaped into a substantially conical configuration. Plow 34 is also inclined in the direction of rotation of medium 24 so that it will efficiently sweep the dewatered material over the periphery of the medium at the desired location.

As the material is carried by medium 24 from conduit 30 to plow 34 it is dewatered in two ways. First, due to the conical configuration of the material bed formed by the plow and rake, a substantial quantity of the liquid flows from the upper surface of the material and passes downwardly over the periphery of the filter medium. Conveniently, a means such as trough 38 is positioned about the periphery of the medium for collecting such liquid. For most granular particulate material, such as crushed ore constituents, it has been found that very little of the material itself will be washed over the periphery of the medium by the liquid passing thereover. After being deposited onto the bed of material from conduit 30, the material quickly settles and adheres to the upper surface of the bed. However, if desired, the liquid collected in trough 38 may be injected into the feed slurry so that any small amount of material which is washed over the periphery of the medium may be reclaimed.

Secondly, liquid is also removed from the particulate material through medium 24 under the influence of gravity and a vacuum applied therethrough. A vacuum-applying means is provided for producing the desired vacuum and communicating it to the lower surface of medium 24. Such means comprises a motor driven vacuum pump 40, conduit member 22, a large diameter conduit 44, a small diameter conduit 42, and a tank 46.

As shown in FIG. 4, conduit 44 is connected at its upper end to the lower end of shaft 18 and extends downwardly through the center of member 22. The conduit passes through the bottom of the member and is attached thereto by a flanged connection 48. From the bottom of member 22, conduit 44 extends downwardly into tank 46, having its lower end opening into the tank.

Conduit 42 communicates between vacuum pump 40 and the interior of member 22, extending upwardly into the member within conduit 44. Two pluralities of openings 50 and 52 are provided in conduit 44 for admitting gas and liquid, respectively, into the conduit. The suction applied by vacuum pump 40 draws gas from within member 22, through openings 50 and into the upper open end of conduit 42. The upper end of conduit 42 is disposed above openings 50 so that any liquid which passes through the openings will not be drawn into the conduit.

The preponderance of the liquid drawn into member 22 flows to the bottom of the member under the influence of gravity and into conduit 44 through openings 52. From conduit 44 the liquid flows downwardly into tank 46.

Since conduit 42 extends upwardly into member 22 through conduit 44, the liquid in tank 46 forms a barometric seal between the interior of member 22 and the atmosphere. Such an arrangement removes the necessity for providing any rotary vacuum seal, while effectively maintaining the desired vacuum environment within member 22.

Also, since a substantial quantity of the liquid in the slurry flows off the surface of the particulate material, as described above, the amount of liquid required to be drawn through filter medium 24 is greatly decreased, thus reducing the vacuum required for achieving a particular degree of dewatering and increasing the capacity of the filter.

These advantages are realized as a result of orienting plow 34 and to a lesser degree rake 32, so that the upper surface of the material bed on filter medium 24 is shaped into a substantially conical configuration.

Conveniently, as the dewatered material is swept from medium 24 by plow 34 it is deposited onto a belt conveyor 36 for transport to a subsequent treatment station.

While the foregoing constitutes a detailed description of a preferred embodiment of the invention, it is understood that various modifications thereof will occur to those skilled in the art. For example, filter medium 24, instead of being substantially planar, might itself be conically shaped sloping outwardly and downwardly from the rotational axis to the periphery thereof. Therefore, the scope of the invention is to be limited solely by the scope of the appended claims.

I claim:

1. In a rotary vacuum filter including; a rotatably mounted, substantially horizontally disposed filter medium; means for rotating said medium about a substantially vertical axis; means for feeding a slurry of particulate material onto the upper surface of said medium; vacuum-applying means communicating with the lower surface of said medium for drawing liquid in the slurry downwardly through said medium; and means for removing particulate material from the upper surface of said medium; the improvement wherein said particulate material removing means comprises a plow positioned above said medium, said plow having a lower edge extending outwardly and downwardly from said vertical axis to the periphery of said medium so that as the medium rotates under said lower edge, the upper surface of the particulate material on the medium will be shaped into a substantially conical configuration, whereby a portion of the liquid in the slurry will flow from the upper surface of the particulate material and pass downwardly over the periphery of the medium under the influence of gravity, thereby reducing the amount of liquid required to be drawn through the medium by said vacuum-applying means.

2. A rotary vacuum filter as recited in claim 1, wherein said vacuum-applying means includes a substantially conically shaped conduit member positioned adjacent the lower surface of said medium.

3. A rotary vacuum filter as recited in claim 2, wherein said conduit member is mounted for rotation with said medium.

4. A rotary vacuum filter as recited in claim 1, further including means positioned about the periphery of said medium for collecting the liquid that flows from the upper surface of the particulate material.

5. A rotary vacuum filter as recited in claim 1, wherein said medium is substantially planar.

6. A rotary vacuum filter as recited in claim 1, further including a rake positioned above said medium for distributing the particulate material over the upper surface of the medium.

7. A rotary vacuum filter as recited in claim 6, wherein said rake extends outwardly and downwardly from said vertical axis to the periphery of said medium so that the particulate material will be distributed over the upper surface of the medium in a substantially shaped bed.

8. A rotary vacuum filter as recited in claim 6, wherein said rake is positioned ahead of said plow and said feeding means is positioned ahead of said rake with respect to the direction of rotation of said medium so that as the particulate material is fed onto the upper surface of the medium, the material is engaged by the rake before it is engaged by the plow.

9. A rotary vacuum filter as recited in claim 1, wherein at least a portion of said plow is inclined in the direction of rotation of said medium.

References Cited
UNITED STATES PATENTS

| | | | |
|---|---|---|---|
| 701,687 | 6/1902 | Desaulles | 210—396 |
| 891,654 | 6/1908 | Baenen | 210—396 |
| 2,540,517 | 2/1951 | Glasco | 210—396 X |
| 2,636,612 | 4/1953 | Cording et al. | 210—396 X |
| 2,716,494 | 8/1955 | Hursh | 210—396 |

REUBEN FRIEDMAN, *Primary Examiner.*

J. L. DE CESARE, *Assistant Examiner.*

U.S. Cl. X.R.

210—406